US012750941B2

(12) United States Patent
Tantawi

(10) Patent No.: US 12,750,941 B2
(45) Date of Patent: Sep. 29, 2026

(54) HIGH-EFFICIENCY DISTRIBUTED-COUPLING LINEAR ACCELERATOR DESIGN

(71) Applicant: TibaRay, Inc., Santa Clara, CA (US)

(72) Inventor: Sami Tantawi, Stanford, CA (US)

(73) Assignee: TibaRay, Inc., Santa Clara, CA (US)

( * ) Notice: Subject to any disclaimer, the term of this patent is extended or adjusted under 35 U.S.C. 154(b) by 120 days.

(21) Appl. No.: 18/123,893

(22) Filed: Mar. 20, 2023

(65) Prior Publication Data

US 2023/0380047 A1 Nov. 23, 2023

Related U.S. Application Data

(60) Provisional application No. 63/344,322, filed on May 20, 2022.

(51) Int. Cl.

| | |
|---|---|
| ***H05H 7/22*** | (2006.01) |
| ***H05H 7/12*** | (2006.01) |
| ***H05H 9/04*** | (2006.01) |

(52) U.S. Cl.
CPC ................ *H05H 7/22* (2013.01); *H05H 9/04* (2013.01); *H05H 2007/122* (2013.01)

(58) Field of Classification Search
CPC ....... H05H 9/04; H05H 2007/122; H05H 7/22
See application file for complete search history.

(56) References Cited

U.S. PATENT DOCUMENTS

| | | |
|---|---|---|
| 4,118,652 A | 10/1978 | Vaguine |
| 6,844,689 B1 | 1/2005 | Brown et al. |
| 7,012,386 B1 | 3/2006 | Berg et al. |
| 9,386,682 B2 | 7/2016 | Tantawi et al. |
| 2006/0011825 A1 | 1/2006 | Pirozhenko et al. |
| 2009/0284749 A1 | 11/2009 | Johnson et al. |
| 2010/0127804 A1 | 5/2010 | Vouloumanos |
| 2015/0359080 A1 | 12/2015 | Dolgashev |

(Continued)

OTHER PUBLICATIONS

Cattelino et al., "Fast- and Super-Fast-Warm-up Cathodes Using Novel APG/APBN Heaters", IEEE Transactions on Electron Devices, vol. 38, No. 10, Oct. 1991, pp. 2239-2243.

(Continued)

*Primary Examiner* — Monica C King
(74) *Attorney, Agent, or Firm* — Kilpatrick Townsend & Stockton LLP

(57) ABSTRACT

A linear accelerator having multiple cavities along a beamline that is powered by a pair of distribution waveguide manifolds with a sequence of feed arms connecting the manifolds to the cell sections and a single RF feed is described herein. The distribution waveguide manifolds are connected to the cell sections so that alternating pairs of cell sections are connected to opposite distribution waveguide manifolds. The individual cavities are individually optimized according to the electron speed along the beamline. The geometry of the cell junctions and connecting channels between the manifolds and cavities can be individually optimized along the beamline as well and can include a serpentine configuration to provide a consistent RF channel length between the manifolds and differing cavities. Methods of designing the linear accelerator and fabricating the accelerator are also provided.

34 Claims, 7 Drawing Sheets
(7 of 7 Drawing Sheet(s) Filed in Color)

(56) References Cited

U.S. PATENT DOCUMENTS

| | | | | |
|---|---|---|---|---|
| 2016/0014876 | A1 | 1/2016 | Tantawi et al. | |
| 2016/0193481 | A1* | 7/2016 | Tantawi | G05F 1/66 700/297 |
| 2016/0193482 | A1* | 7/2016 | Fahrig | H05H 9/048 600/1 |

OTHER PUBLICATIONS

Chubar et al., "A 3D Magnetostatics Computer Code for Insertion Devices", Journal of Synchrotron Radiation, vol. 5, May 1, 1998, pp. 481-484.
Dolgashev et al., "Geometric Dependence of Radio-frequency Breakdown in Normal Conducting Accelerating Structures", Applied Physics Letters, vol. 97, No. 17, Oct. 25, 2010, 3 pages.
Elleaume et al., "Computing 3D Magnetic Fields from Insertion Devices", Proceedings of the 1997 Particle Accelerator Conference, May 1997, pp. 3509-3511.
Gold , "Applications of Lagrangian Field Theory in the Computational Modeling of Beam-wave Interactions", Stanford University, Aug. 2019, pp. 1-24.
Karzmark et al., "Medical Electron Accelerators", Chapter 3, McGraw-Hill, Incorporated, Health Professions Division, 1993, 76 pages.
Knapp , "Linear Accelerator Conference", MURA-714, 1964, 29 pages.
Knapp et al., "Standing Wave High Energy Linear Accelerator Structures", The Review of scientific instruments, vol. 39, No. 7, Jul. 1968, pp. 979-991.
Laurent et al., "Experimental Study of RF Pulsed Heating", Physical Review Accelerators and Beams, vol. 14, No. 4, Apr. 7, 2011, pp. 041001-1-041001-21.
Leupold et al., "Novel High-field Permanent-magnet Flux Sources", IEEE Transactions on Magnetics, vol. 23, No. 5, Sep. 1987, pp. 3628-3629.
Maxim et al., "Phaser: A Platform for Clinical Translation of Flash Cancer Radiotherapy", Radiotherapy and Oncology, vol. 139, Oct. 2019, 23 pages.
Nanni et al., "C3 A Cool Copper Collider", Jan. 13, 2022, 19 pages.
Othman et al., "Solid-State Powered X-Band Accelerator", SLAC National Accelerator Laboratory, Nov. 2016, 22 pages.
Tantawi et al., "Design and Demonstration of a Distributed-coupling Linear Accelerator Structure", Physical Review Accelerators and Beams, vol. 23, No. 9, Sep. 2020, pp. 092001-1-092001-11.
Tigner et al., Handbook of Accelerator Physics and Engineering, 3rd printing (World Scientific Publishing Company, Singapore), 1999, 3 pp.
Wangler , "Rf Linear Accelerators", Wiley, Chapter 4, Jan. 2008, 465 pages.

* cited by examiner

HIGH-EFFICIENCY DISTRIBUTED-COUPLING LINEAR ACCELERATOR DESIGN

CROSS-REFERENCES TO RELATED APPLICATIONS

This application is a Non-Provisional of and claims the benefit of priority of U.S. Provisional Application No. 63/344,322 filed May 20, 2022, which is incorporated herein by reference in its entirety.

STATEMENT AS TO RIGHTS TO INVENTIONS MADE UNDER FEDERALLY SPONSORED RESEARCH AND DEVELOPMENT

This invention was made with government support under Grant DE-SC0017771 awarded by the U.S. Department of Energy. The government has certain rights in the invention.

FIELD OF THE INVENTION

The present invention relates generally to linear accelerator designs and associated features, systems and methods of use, design and manufacture.

BACKGROUND

Conventional linear particle accelerators typically have low RF to beam efficiency, with only about 20-30% of the RF power being used for beam acceleration while the rest gets deposited as heat in the copper structure. These conventional designs are either geared towards producing high gradients and involve cavities coupled to the neighbors through the beam tunnel (see for example, ((1) C. Karzmark, C. Nunan, and E. Tanabe, Medical Electron Accelerators. Chap. 3, ISBN: 97 071054102 (McGraw-Hill, Incorporated, Health Professions Division, 1993); (2) T. Wangler, Rf Linear Accelerators. Chap. 4 (Wiley, New York, 2008); (3) T. Maury and C. Wu, Handbook Of Accelerator Physics And Engineering, 3rd printing (World Scientific Publishing Company, Singapore, 1999)) or avoid this coupling issue by using bi-periodic or side-coupled cavities but are unable to handle high gradients (see for example, (4) E. A. Knapp, Linear Accelerator Conference, MURA-714, p. 31. (1964); (5) E. A. Knapp, B. C. Knapp, and J. M. Potter, Standing wave high energy linear accelerator structures, Rev. Sci. Instrum. 39, 979 (1968)). The coupling of adjacent cells in the first case limits the ability to optimize the cavity shapes. Side-coupled and bi-periodic linear accelerators are better suited for cavity optimization, but suffer from RF losses in these coupler cavities. These cavities are considered idle cavities with no energy stored in them, but this is a myth because poynting vector theory dictates that power has to flow through these side cavities to supply power to the accelerating cavities that are separated from the structure's feed waveguide by many of these side-coupled cavities. The basic concept of distributed coupling addresses some of these issues. Distributed coupling allows for feeding of each accelerator cell independently using a periodic feeding RF network. (see for example, 1) U.S. Pat. No. 9,386,682; (2) Sami Tantawi, Mamdouh Nasr, Zenghai Li, Cecile Limborg, and Philipp Borchard, "Design and demonstration of a distributed-coupling linear accelerator structure," Phys. Rev. Accel. Beams 23, 092001 Pub. 10 Sep. 2020; (3) Peter G. Maxim, Sami G. Tantawi, Billy W. Loo Jr., "PHASER: A platform for clinical translation of FLASH cancer radiotherapy," Radiotherapy and Oncology, Volume 139, October 2019). However, this approach presents challenges that, thus far, have placed practical limitations on the scale and efficiencies of such accelerators.

Thus, there exits a need for improved LINAC designs having improved efficiency and that are relatively compact. There is further needs for such LINAC designs with streamlined power supply requirements. There is additionally a need for such LINAC designs that can be optimized for a wide range of capabilties in a practical manner in regard to both design and manufacturing.

BRIEF SUMMARY OF THE INVENTION

The present invention pertains to a high-efficiency distributed-coupling linear accelerator, in particular, linear accelerators having multiple cavities with distributed-couplings to a pair of RF waveguide manifolds.

In one aspect, the invention pertains to a linear accelerator comprising a Y-coupler RF waveguide combined with vacuum ports and RF windows.

In some embodiments, the linear accelerator includes a single RF feed that is common to both manifolds. The single RF feed can include a Y-coupler RF waveguide that splits the RF input to each of the pair of manifolds along an intermediate portion thereof, which in turn feeds each cavity through distributed-couplings. In some embodiments, the multiple cavities include a buncher and capture cavity section and an accelerating section with accelerating cavities, and the single RF feed is common to the entire accelerator structure. In some embodiments, each of the cavities of the entire structure are optimized by application of a scattering matrix iteratively applied to the design of each cavity. In some embodiments, the accelerator design is such that the accelerator body includes all cavities, manifolds and junction-couplings and can be formed by a CNC machine. Similarly, the RF power supply assembly can include a Y-coupler that is formed by a CNC machine with minimal parts.

In one aspect, the invention pertains to a linear accelerator comprising: a body defining: a plurality of cavities along a beamline extending between an input and an output; a pair of distribution waveguide manifolds; a sequence of feed arms connecting the manifolds to the plurality of cavities; wherein the distribution waveguide manifolds are connected such that alternating pairs of cell sections are connected to opposite distribution waveguide manifolds; and a single RF power feed common to both of the pair of distribution waveguide manifolds and the plurality of cavities. In some embodiments, the single RF power feed comprises a Y-coupler RF waveguide. In some embodiments, the Y-coupler RF waveguide comprises a main body that splits into two arms that each extends to an RF port of a corresponding manifold of the pair of waveguide manifolds. In some embodiments, the Y-coupler RF waveguide comprise an RF window for a single RF input. Optionally, the Y-coupler is designed so as to be machinable on a CNC machine. In some embodiments, each of the plurality of cavities is optimized. In some embodiments, a design of each of the plurality of cavities is individually optimized by application of a scattering matrix.

In some embodiments, each of the plurality of cavities is individually optimized by adjusting their lengths and shapes for an electron speed at a location of the respective cavity along the beamline. In some embodiments, the plurality of cavities includes one or more cavities defined for a buncher and capture section so that the length is optimized to match the beam bunch arrival time with the RF phase for the varying sub-speed of light beam velocities along these sections. In some embodiments, the buncher and capture section comprises at least one cavity configured for both buncher and capture functions with varying lengths (periods) to accommodate the slowly varying beam speeds as they approach the speed of light.

In some embodiments, the plurality of cavities includes multiple subsequent cavities along the beamline defined as an accelerating section. In some embodiments, the common RF feed powers both the buncher and capture section and the accelerating section. In some embodiments, the sequence of feed arms are defined as a plurality of T-cell junctions. In some embodiments, a geometry of each of the plurality of T-cell junctions coupling the manifolds to the plurality of cells is optimized such that the dimensions thereof differ along a length of the beamline to appropriately supply the power in the correct phase for each cavity. In some embodiments, a geometry of each of the plurality of T-cells coupling the manifolds to the plurality of cells are designed so as to be machinable on a CNC machine. In some embodiments, each waveguide manifold comprise a plurality of irises and Miter bends to allow for equal distribution of power with minimum losses in the forward direction.

In another aspect, the invention pertains to a method of designing a high-efficiency distributed linear accelerator. Such methods can comprise: determining geometries of a linear accelerator body to be defined from a conductive metal block, the body having a plurality of cavities aligned along a central beamline and a pair of manifold waveguides on opposite sides of the central beamline for distribution of power supply to the plurality of cavities from a single common RF feed; and determining geometries of a plurality of waveguide coupling junctions between the pair of manifolds and each of the cavities in order to transmit RF from the pair of manifolds to the plurality of cavities. In some embodiments, a respective cavity is optimized individually by application of a scattering matrix, and this same optimization approach is iteratively to each other cavity of the plurality such that the geometries of each of the plurality of cavities is optimized for an electron speed associated with a given location along the beamline.

In some embodiments, due to the differing geometries of the plurality of cavities, a distance between the plurality of cavities and the respective manifolds coupled thereto differs along the beamline. In such embodiments, the methods can further comprise: determining geometries of the plurality of waveguide coupling junctions so as to include a serpentine portion such that a length of a waveguide channel for each of the plurality of waveguide coupling junctions is consistent along the beamline. In some embodiments, the methods can further comprise: determining a geometry of a Y-coupler RF waveguide for the single RF feed to supply RF power to both manifolds and the plurality of channels of the entire linear accelerator.

In yet another aspect, the invention pertains to a method of forming a high-efficiency distributed linear accelerator. Such methods can comprise: fabricating a linear accelerator body from a conductive metal, such as copper, the body having a plurality of cavities aligned along a central beamline and a pair of manifolds on opposite sides of the central beamline for distribution of power supply to the plurality of cavities, wherein the linear accelerator body is defined by upper and lower halves; fabricating a plurality of waveguide coupling junctions between the pair of manifolds and each of the cavities in order to transmit the supply RF power from a single common RF power feed coupled to the pair of manifolds to the plurality of cavities, wherein each of the cavities is optimized individually by application of a scattering matrix such that the geometries of each of the plurality of cavities is optimized for an electron speed associated with a given location along the beamline; and fabricating a Y-coupler RF waveguide for coupling the single RF power feed to the pair of manifolds.

In some embodiments, one or both of: the plurality of cavities, the pair of manifolds and the plurality of RF waveguide coupling junctions are fabricated by a 3-axis CNC machine in two blocks of conductive metal defining the upper and lower halves; and the Y-coupler RF supply is formed by a 3-axis CNC machine, optionally within three or less parts.

In some embodiments, the linear accelerator is configured such that the connection between the T-junction and the cavity is achieved through a narrow, folded waveguide section with a very specific length that achieves any or all of the following goals: (1) preventing a choke condition on the T-junction when the cavity is tuned to off resonance due to manufacturing error or breakdown events; (2) the length of this folded waveguide supplies a constant phase from the manifold to the cavity (3) use of folding of the waveguide as an added degree of freedom to keep the total length between the manifold and the cavity independent from the location of the exit of the manifold to the entrance of the cavity; these distances between the exit of the manifold and the entrance to the cavities change because of the changing periods of the cavities and the periods of the T-junctions.

In some embodiments, the first cavity of the linear accelerator can be fed independently at much lower power and with varying phase to bunch the initial beam and therefore affect the captured electrons from a DC gun. This is done by a separate waveguide coupling that goes on top of the linear accelerator with a separate feed. In some embodiments, feeding of the first cavity can be done with a tap-off from one of the manifolds so that it also externally couples the power to the top of the linear accelerator and the connection between that tap-off and the cavity can be done through a variable phase shifter and variable attenuator to adjust the power to the first cavity. In some embodiments, power can also be supplied to the first cavity from an individual phase-locked amplifier or oscillator. In some embodiments, the power can also be supplied to the first cavity by tapping off from the main power to the linear accelerator.

In some embodiments, not only can the first cavity can be powered independently as mentioned previously, but this can also be done for a set of the initial cavities such that the capture is not affected by the main power supply to the linear accelerator. In some embodiments, the topology of such a linear accelerator as described would allow varying the main power to the linear accelerator to result in a variable energy linear accelerator. In some embodiments, the initial set of cavities can be powered by their own Y-coupler and two manifolds as a sub-linear-accelerator section of the main linear accelerator thus allowing also for a variable current by changing the capture through a variation of power and phase between the first cavity and the remaining initial set of cavities in addition to the variability of the energy in the embodiments described previously. In some embodiments, the current to the main linear accelerator can be typically modified using only the buncher cavity for a varying-dose linear accelerator by changing the phase and the amplitude of the first cavity.

It is appreciated the innovations described herein make it possible to produce a distributed-linear accelerator on a large scale with high yield with advantages in terms of compactness, weight and RF power needed, and further allows for ease in both design and manufacture.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

The present invention pertains to high-efficiency distributed-coupling linear accelerators, in particular, linear accelerators having multiple cavities with distributed-couplings to a pair of manifolds. This topology of distributed coupling allows for the coupling between cells to have a wide range of acceptable values, including being negligibly coupled. The accelerator cells can then be individually optimized to either achieve the highest shunt impedance and/or provide high field gradients by modifying the field along the cell walls (see for example, (1) U.S. Pat. No. 9,386,682; (2) Sami Tantawi, Mamdouh Nasr, Zenghai Li, Cecile Limborg, and Philipp Borchard, "*Design and demonstration of a distributed-coupling linear accelerator structure*," Phys. Rev. Accel. Beams 23, 092001 Pub. 10 Sep. 2020; (3) Peter G. Maxim, Sami G. Tantawi, Billy W. Loo Jr., "*PHASER: A platform for clinical translation of FLASH cancer radiotherapy*," Radiotherapy and Oncology, Volume 139, October 2019). Thus far, the design adopted for distributed coupling linear accelerators uses a π-phase shift between adjacent cavities to achieve maximum isolation between cavities. This allows for the RF to be fed through two sets of manifolds. The manifold, in the present case, can be further simplified by supplying the power from the manifold to one cavity every λg/2 resulting in a two-cavity alternating tap-off design as shown. The existing designs for conventional linear accelerators has a dedicated buncher section with its own RF feed and a speed-of-light (SOL) section with identical cavities and the manifold for supplying RF power to these cavities. In the present case, the buncher and accelerating cavities can be unified into one compact and efficient structure with one common RF feed. This approach is greatly desirable for productizing such linear accelerators, especially if it is a standalone device starting from a low voltage gun. The concepts of distributed couplings as proposed however, can raise certain design challenges, which can be address by utilizing various novel layout approaches and design features as discussed in further detail below.

I. Linear Accelerator Structure

Figure 1:
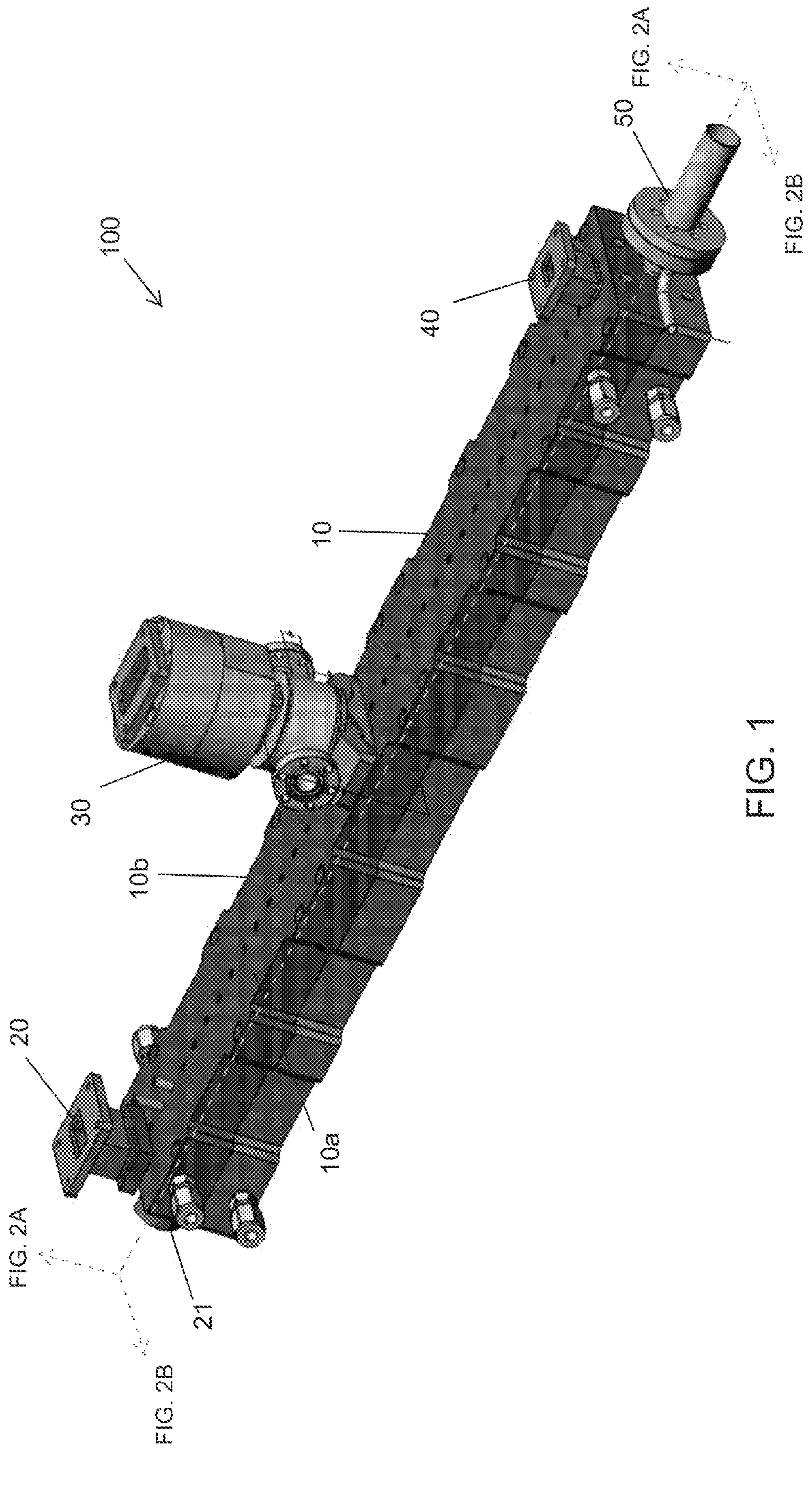
FIG. 1 illustrates a linear accelerator design, in accordance with some embodiments.
Figure 2A:
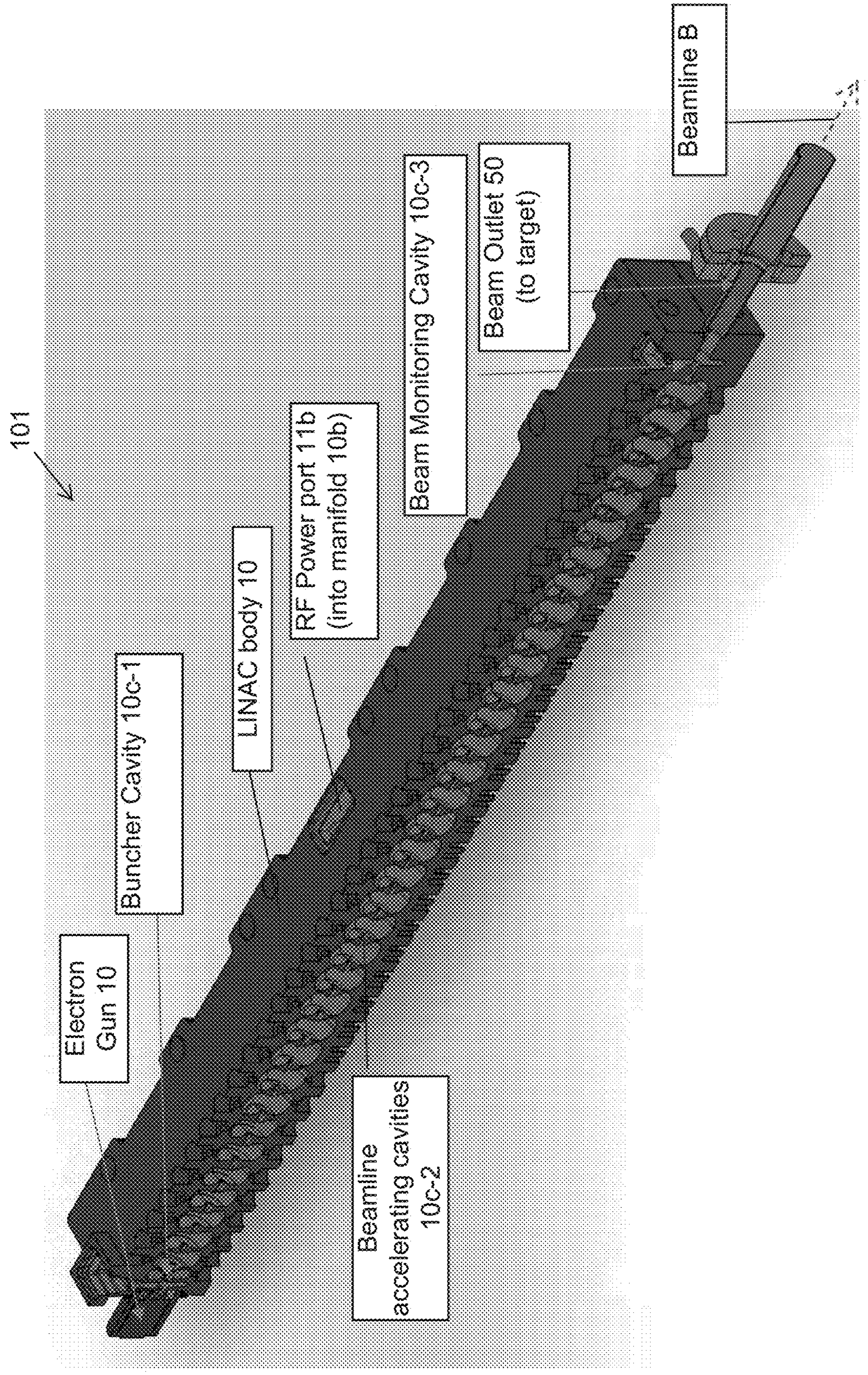
FIGS. 2A and 2B illustrates cross-sectional views of the accelerator design in FIG. 1
Figure 2B:
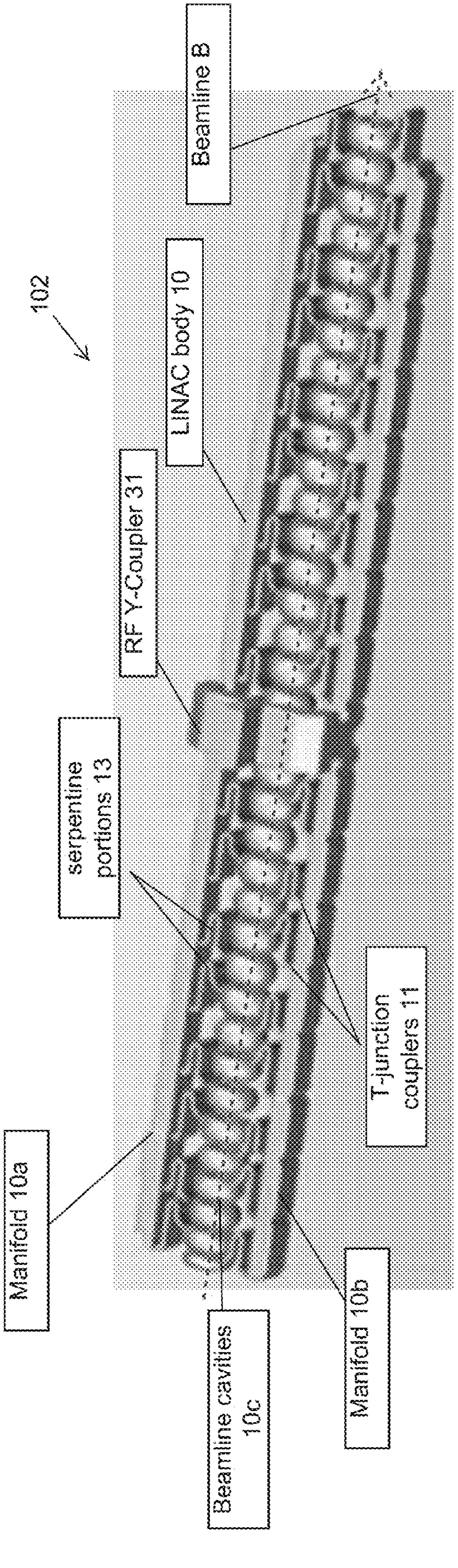

FIG. 1 shows an exemplary linear accelerator design 100 utilizing the concepts described above. FIGS. 2A-2B shows a cross-sectional view of the linear accelerator design in FIG. 1. FIG. 2A shows a vertical cross-section 101 along the beamline B, and FIG. 2B shows a horizontal cross-section 102 along the beamline B. This design includes a body comprised of upper and lower halves, in which are defined the dual waveguide manifolds 10*a*,10*b* disposed on opposite sides of a central beamline 10*c*. The electron gun 21 (e.g. eGun) is disposed at a proximal end of the body 10, an input monitor 20 can be coupled to the buncher cavity 10*c*-1, the RF power supply assembly 30 is attached to an intermediate portion of the body 10 within the accelerating section having accelerating cavities 10*c*-2 and feeds respective RF power ports in each manifold (see RF port 11*b* of manifold 10*b* in FIG. 2). A beam monitor 40 is disposed atop the beam monitoring cavity 10*c*-3 before the beam exits at the beam outlet 50 at the distal end of body 10. In one notable aspect, the linear accelerator body combines the buncher section and the rest of the linear accelerator in one structure (without requiring a separate buncher section with separate power supply), which is advantageous in many respects from conventional distributed-coupling linear accelerators. As can be seen in FIG. 2B, the body 10 includes T-junction couplers which provide RF channels between the manifolds and the cavities 10*c*. In this design, the cavities are couples in pairs to an adjacent manifold. Since the individual sections of the manifold between the couplers 11 as well as the individual cavities 10*c* are optimized, the geometry of each differs along the beamline, thereby complicating the geometry of the couplers 11. Serpentine portions 13 are included to provide a consistent RF channel length between the manifold and the cavities, thereby allowing a single RF supply to power the entire structure.

Figure 4:
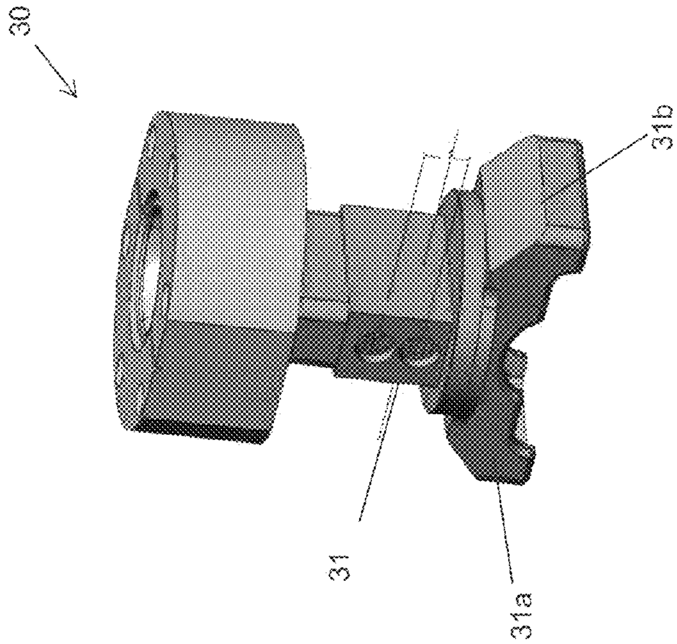
FIG. 4 illustrates a detail view of a Y-coupler of the RF feed assembly, in accordance with some embodiments.
Figure 3:
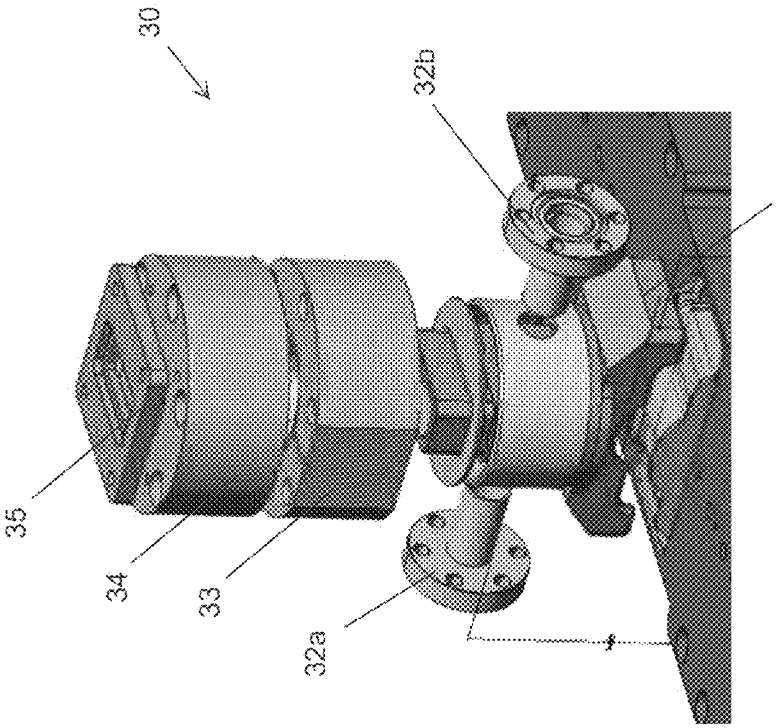
FIG. 3 illustrates a detail view of a common RF feed input assembly attachable to an intermediate portion of the linear accelerator body to provide RF power supply to the pair of manifolds, in accordance with some embodiments.

FIG. 3 shows the single RF supply assembly 30 that brings power from the RF source to the two manifolds in the linear accelerator of FIG. 1. FIG. 4 shows a detail view of the Y-coupler 31 of the RF assembly. The RF window 35 atop the RF supply assembly 30 allows for transmission of RF power therethrough to power the linear accelerator manifolds. The Y-coupler 31 can be formed as one or more components. The Y-coupler includes a main body and two distal arms 31*a*, 31*b* that extend to respective RF ports of each of the pair of manifolds 10*a*,10*b* and can include interfacing features 32*a*,32*b* and 33,34. In some embodiments, the Y-coupler 31 is designed so that it can be machined on a 3-axis CNC machine and has minimal number of parts (e.g. less three or less parts, two parts, a single unitary component).

For distributed-coupling linear accelerators, the design of the structure, including the RF distribution manifold and cascaded T-junctions is such that the power in the feeding lines has minimal influence on the cavity cells. This is achieved when the RF wave reaches minimal standing-wave ratio (SWR) within the feeding lines to the cavities. Also, the cavities are independent of each other in this it-mode operation. This results in the two nearly isolated systems: the RF feeding networks and the individual cavities, allowing for their independent optimization. Advantageously, a cellby-cell optimization can be performed to extend this topology to the bunching and capture section, during which the speed of the electrons changes very rapidly. In one aspect, the choice of the cavity dimensions and their locations along the beam path as well as the manifold and serpentine feeder line dimensions are optimized for maximum RF to beam efficiency. In some embodiments, this approach allows the accelerator to best captured without focusing magnets and minimum sensitivity to dimensional tolerances. In some embodiments, the beam tunnel, especially in the initial section, is optimized and modified for maximizing the capture of the electrons.

II. Design Aspects

1. Cavity Optimization

In one aspect, the linear accelerator design herein has modified existing distributed coupling-based linac topology and designing methodology. This modified approach allows for optimized cell shapes for efficiency (e.g. high shunt impedance), and improved gradient handling capabilities. For a 10 MeV, 300 mA linear accelerator, the design utilized a genetic optimization algorithm that generates the highest possible gradients. In this embodiment, it was configured to produce cavity shapes with shunt impedance of ~180 MΩ/m. In another aspect, the design is such that it can be easily machined. For example, in assembling the linear accelerator from these cavities, a minimum wall thickness as is practical is maintained between structures, to maintain mechanical integrity during machining, and the reentrant features were designed to obey machining rules for a conventional 3-axis milling machines. In some embodiments, the first buncher cavity was additionally designed and simulated in conjunction with the electron gun with its location optimized for maximum electron capture.

Figure 5A:
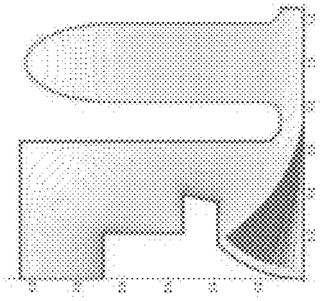
FIGS. 5A-5D illustrate differing cavity designs of an exemplary linear accelerator design, in accordance with some embodiments.
Figure 5B:
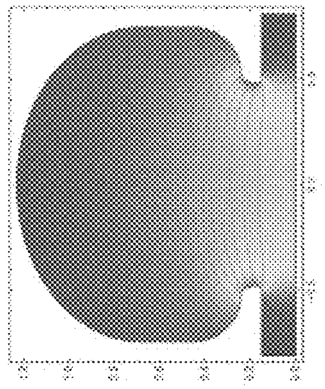
Figure 5C:
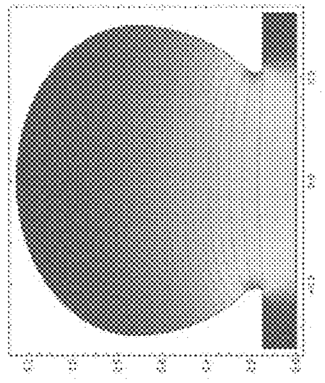
Figure 5D:
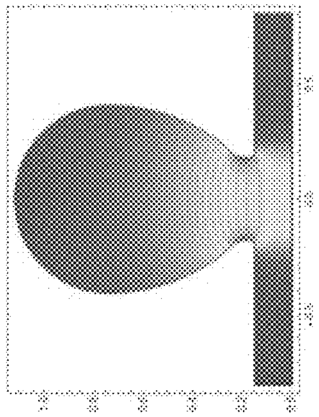

FIGS. 5A-5D shows the different cavity designs generated by the algorithm. FIG. 5A showing the first buncher cavity (in green-at right) along with the electron gun located at optimal spacing from the e-gun to maximize electron capture. FIGS. 5B-D show the electric field in the different cavity-shapes examples. Each of these cavities have been individually optimized for different electron speeds along the beamline. As the electrons gets accelerated and their average velocity is increased, a different cavity-type optimized for that speed is used until the speed reaches roughly the speed of light. Then, the linear accelerator continues with only one cavity type, the speed of light cavity shown in FIG. 5B. This judicious combination of different cavity shapes along the length of the linear accelerator allows for unified bunching and accelerating sections with a common RF feed, which is a unique feature and clear departure from conventional designs.

2. Manifold Design

In another aspect, optimal cavity-type and locations have been selected through an iterative process to maximize the electron capture along the length of the linear accelerator. In particular, it is desirable to maintain the it-mode character of the structure while allowing the cavities fields to be synchronous with the electron bunches despite their fast varying speed. To keep the phase advance between cavities constant, the distance between cavities has to change from small values to larger values as the speed of the electrons increases to reach light speed. Then, the distances between cavities could be maintained at half of the free-space wavelength. As mentioned above, the cavities have been optimized with different lengths to allow this design methodology. Consequently, in such embodiments, the RF feeding network must have a varying distance between the tap-off points to follow the cavity locations. This can be accomplished by varying the dimensions of the manifold feeding network to change the guided wavelength along the manifold, and hence the distance between tap-offs is maintained at half of the guided wavelength while the physical distance is varying to accommodate the cavity locations. Thus, the individual sections between tap-off points are also optimized along the beamline.

The optimal design of the manifold junction requires achieving a minimal standing wave within the manifold waveguide. To this end, each three-port network representing the manifold with a feed point must have a precise scattering matrix representation. This mathematical representation could be achieved by adding features to the junction such that the manifold exerts minimal influence on the cavity. This allows for the cavity coupling to be adjusted separately.

Figure 6:
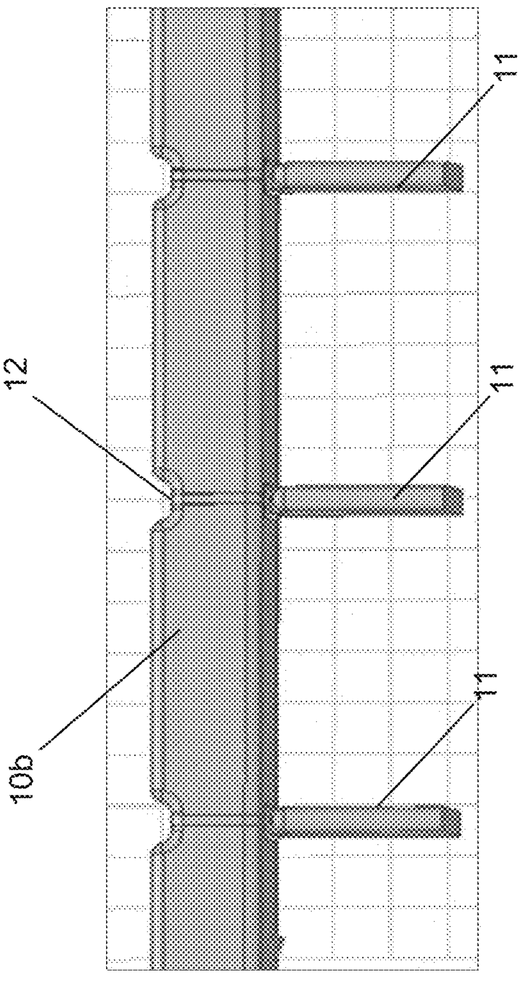
FIG. 6 illustrates a side view of an RF waveguide manifold having multiple T-junction couplers that feed adjacent cavities of the beamline, in accordance with some embodiments.

In another aspect, the exemplary system has been designed with a single RF feed for the whole system, including the capture and bunching sections. This is a considerable advancement over conventional designs requiring multiple separate power feeds for different sections. In this embodiment, each RF manifold block connected to each linear accelerator cavity has been individually optimized. The RF manifold block includes a T-cell/junction 11 and waveguide portion **10*b* extending between junctions, as shown in FIG. 6. Since every T-cell junction would have different dimensions, so the guided wavelengths are adjusted according to locations, a smooth transition between one T-cell junction and its immediate neighbors is ensured to prevent sharp steps along the manifold that would otherwise cause RF reflections and manufacturing difficulties. Each T-cell's depth and height were allowed to be adjusted individually on either side of the T-junction coupler 11, and cut-outs 12**, or iris features, were included at the junction of the 3-port structure for compensation.

Figure 7:
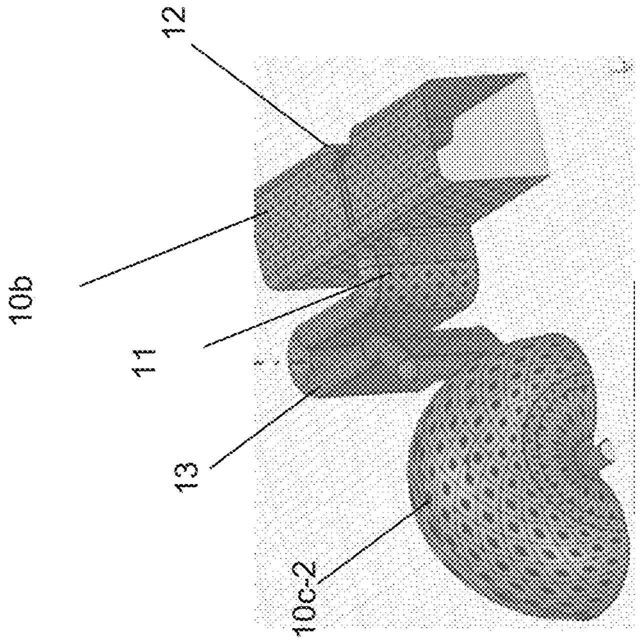
FIG. 7 illustrates a T-junction coupler between the manifold and the cavity, which includes a serpentine portion, in accordance with some embodiments.

FIGS. 6-7 shows a series of such T-junctions. FIG. 6 shows a section of RF manifold **10*b* showing RF manifold blocks including individual T-cell junctions 11 joined together seamlessly. Each T-cell junction 11 extending from the RF manifold feeds an adjacent cavity of the beamline connected thereto. In some embodiments, the manifold block opposite the T-cell junction includes an inwardly curve portion 12 to prevent RF reflections. Additionally, the manifold and T-cell junction can include various design feature to optimize RF transmission and avoid reflections, such as avoiding any sharp corners (e.g. by utilizing rounded corners). As discussed above, due to the variations in the cavity geometry of optimized cavities, the distance from the manifold must change, so to maintain a consistent distance for the RF channels between the manifold and cavities, the T-cell junctions can include a non-linear channel of any suitable geometry, for example a serpentine channel. FIG. 7 shows a half section of an accelerating cavity 10*c*-2 along the beamline connected with the manifold T-cell junction 11 using an optimized serpentine portion 13**.

Figure 8:
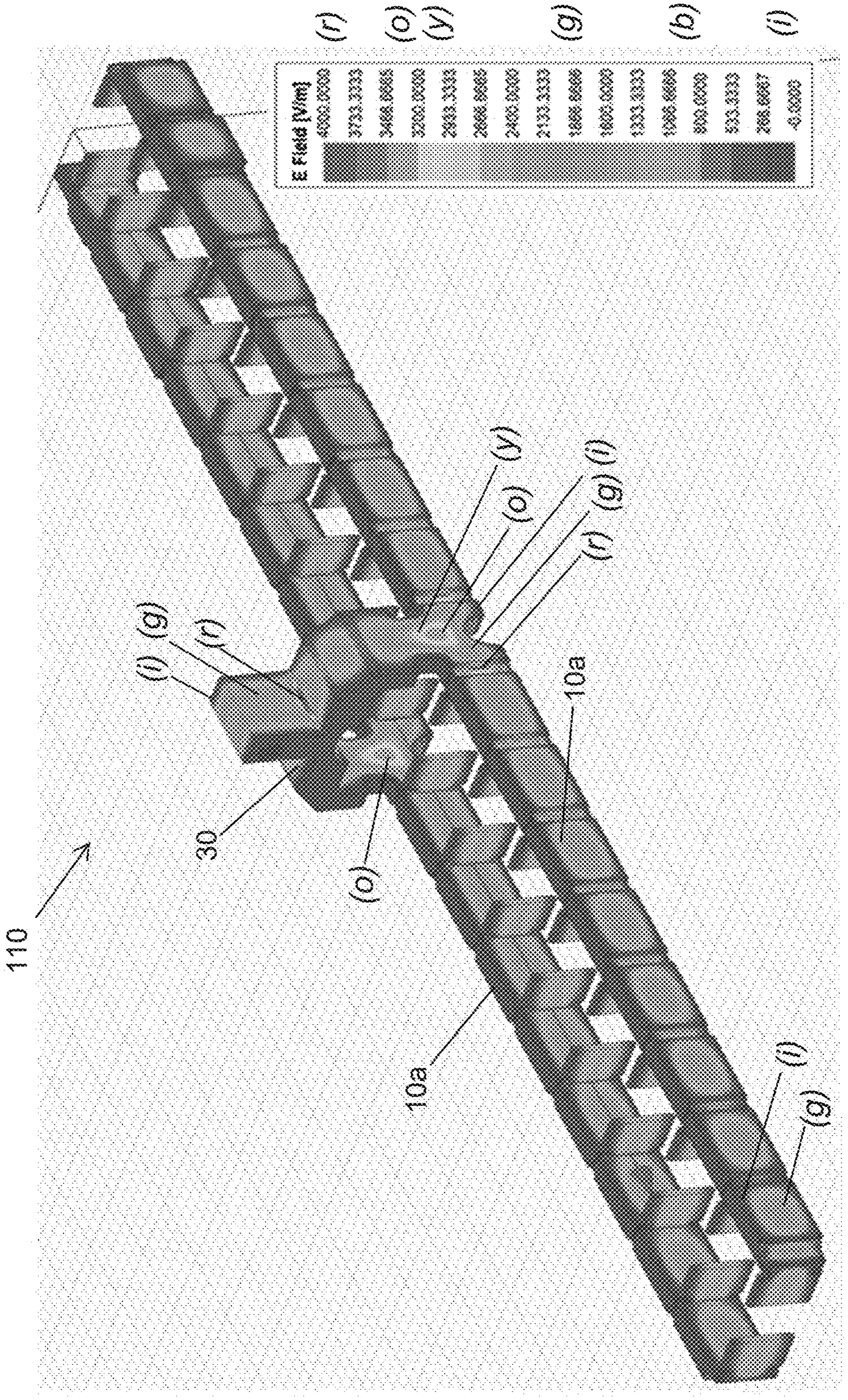
FIG. 8 show an electric field model of an exemplary linear accelerator design, in accordance with some embodiments.

In some embodiments, the whole manifold is constructed with this design methodology. Additionally, a Y-coupler can be added at the center of the manifold so that the linear accelerator is fed from a single input waveguide. An electric field model of this design is shown in FIG. 8 (the beamline cavities not shown). The electric field values in the color map are identified as red (r), orange (o), yellow (y), green (g), blue (b), and indigo (i). In one aspect, the geometry of each of the RF sections between adjacent T-coupling junctions is optimized such that the dimensions of each vary along the length of the beamline. In some embodiments, this linear accelerator design includes judicious choice of irises and Miter bends to allow for equal distribution of power with minimum losses in the forward direction. The resultant S-matrix of the manifold structure is shown in Table 1. It is noted that the scattering matrix indicates a very uniform power distribution while maintaining the correct π phase advance despite the lack of uniformity of the distance between tap-offs. Also, in this approach, the reflection, S11, is minimal. It is appreciated that the scattering matrix in U.S. Pat. No. 9,386,682 or variations thereof could be utilized in designing the linear accelerator, for example by an iterative application to each cavity so as to optimized each cavity for a given electron speed along the beamline. For example, the optimal design of the manifold junction should achieve a minimal standing wave within the manifold waveguide. To this end, each three port network representing the manifold with a feed point, can be in accordance with the following scattering matrix:

$$s = \begin{pmatrix} \frac{1}{-1-2n} & -1+\frac{1}{1+2n} & -\frac{2e^{i\sigma}\sqrt{n}}{1+2n} \\ -1+\frac{1}{1+2n} & \frac{1}{-1-2n} & -\frac{2e^{i\sigma}\sqrt{n}}{1+2n} \\ -\frac{2e^{i\sigma}\sqrt{n}}{1+2n} & -\frac{2e^{i\sigma}\sqrt{n}}{1+2n} & e^{2i\sigma}\left(-1+\frac{2}{1+2n}\right) \end{pmatrix},$$

where n is the number of cavities feed by a single manifold. This would guarantee attaining a minimal VSWR along the manifold. To achieve this matrix, one can modify the shape of the waveguide around the manifold by use of one or more features. One feature can include a protrusion on the wall of the waveguide opposite to the wall with the feed of the junction. Another feature can include widening of the feed from a narrow portion to a wider portion. It is appreciated that various other features could be realized in a similar manner. This approach can be used to design and scale the linear accelerator to accommodate any desired capability, for example to design linear accelerators from 1 MeV to 1 GeV and beyond.

TABLE 1

| Scattering Matrix | | |
|---|---|---|
| Freq | | S: 1 |
| 9.3 GHz | 1 | (−39.6, 86.4) |
| | 2 | (−15.6, 177) |
| | 3 | (−15.5, −12.1) |
| | 4 | (−15.5, 166) |
| | 5 | (−15.5, −13.2) |
| | 6 | (−15.5, 167) |
| | 7 | (−15.5, −13.2) |
| | 8 | (−15.5, 167) |
| | 9 | (−15.5, −13.3) |
| | 10 | (−15.6, 167) |
| | 11 | (−15.6, −13.5) |
| | 12 | (−15.5, 167) |
| | 13 | (−15.5, −13.1) |
| | 14 | (−15.5, 167) |
| | 15 | (−15.5, −13.3) |
| | 16 | (−15.5, 167) |
| | 17 | (−15.5, −13.3) |
| | 18 | (−15.5, 167) |
| | 19 | (−15.5, −7.32) |

TABLE 1-continued

| Scattering Matrix | | |
|---|---|---|
| Freq | | S: 1 |
| | 20 | (−15.6, −57.9) |
| | 21 | (−15.6, 167) |
| | 22 | (−15.6, −13.4) |
| | 23 | (−15.6, 167) |
| | 24 | (−15.6, −13.4) |
| | 26 | (−15.6, −13.4) |
| | 27 | (−15.6, 166) |
| | 28 | (−15.6, −13.4) |
| | 29 | (−15.6, 166) |
| | 30 | (−15.6, −14) |
| | 31 | (−15.6, 166) |
| | 32 | (−15.6, −14) |
| | 33 | (−15.6, 166) |
| | 34 | (−15.6, −13.8) |
| | 35 | (−15.6, 166) |
| | 36 | (−15.6, −13.6) |
| | 37 | (−15.6, 172) |

3. Beam Dynamics

In yet another aspect, the linear accelerator beam dynamics were simulated using full 3D particle tracking techniques, allowing for simulating non-linear and space charge effects of charged particles dynamics in electromagnetic fields. The electromagnetic fields for several different cavity types were generated as described in the cavity section. An iterative method was used to select the cavity type and the distance between successive cavities. As the beam propagates along the linear accelerator length, particles are lost. The loss rate is higher in the first few cavities and becomes minimal after that. Nonetheless, this causes beam loading variation from cavity to cavity. Accordingly, the external coupling of the cavities needs to be adjusted. The appropriate coupling coefficient for each cavity can be calculated separately. Then, not only the cavity type is varied along the linac, but also the geometry of the coupling aperture is varied from cavity to cavity. This is an extremely tedious process, however, automating this process allows for a sufficiently speedy design cycle to be practical.

4. Linear Accelerator Integration

In still another aspect, the previous sections have described the process of designing and tuning the cavities and the manifold T-junction for optimal beam propagation. Accordingly, methods have been developed that optimize the joining of the manifold T-junctions to the cavities while maintaining the phase relation and the isolation between the two structures. In some embodiments, the shape of the connecting channel is selected to satisfy a few conditions: (1) it must seamlessly connect with the openings of both the cavity and the T-junction; (2) the feature needs to be easily machinable on conventional CNC machines; and (3) it must have minimum lateral width so that the linac is narrow and hence becomes compact and light weight. In some embodiments, these conditions are met by use of a serpentine structure, such as that shown in FIG. 7. The length of the serpentine was optimized by dividing the structure into two halves along the middle of the U-bend on the serpentine (see red dashed line in FIG. 7). The two structures thus created: the cavity+half serpentine and the T-junction plus half the serpentine portion are analyzed for frequency and phase at the U-bend port. The sum of the phases of the RF beam reaching this location from either side should be 90°. The length of the serpentine is then adjusted till the 90° phase is achieved. This ensures minimal losses of the power travelling down the manifold and minimal coupling between adjacent cavities.

5. Beam Tunnel Design

In yet another aspect, the particle acceptance and forward propagation requires the maximum capture of the charged particles at each stage especially in the bunching section. The dimensions of the beam tunnel that allows for the particles to travel forward need to be optimized for minimizing interaction with the wall and maximizing the interaction with the cavity fields. Typically, a single tunnel diameter is used throughout the interaction length of the linear accelerator. It was found that changing the diameter of the tunnel in sections of the linear accelerator, especially in the buncher region, significantly increases the efficiency of the linear accelerator. This feature is another fundamental departure from conventional linear accelerator design.

The methods, systems, and devices discussed above are examples. It is appreciated that each of the above aspects could be incorporated into a linear accelerator design to impart certain advantages described herein in isolation or in combination with any other design feature discussed herein. Various configurations can omit, substitute, or add various procedures or components as appropriate. For instance, in alternative configurations, the methods can be performed in an order different from that described, and/or various stages can be added, omitted, and/or combined. Also, features described with respect to certain configurations can be combined in various other configurations. Different aspects and elements of the configurations can be combined in a similar manner. Also, technology evolves and some of the elements as described are provided as non-limiting examples and thus do not limit the scope of the disclosure or claims.

Specific details are given in the description to provide a thorough understanding of exemplary configurations (including implementations). However, configurations can be practiced without these specific details. For example, well-known circuits, processes, algorithms, structures, and techniques have been shown without unnecessary detail in order to avoid obscuring the configurations. This description provides exemplary configurations that do not limit the scope, applicability, or configurations of the claims. Rather, the preceding description of the configurations will provide those skilled in the art with an enabling description for implementing described techniques.

Also, configurations can be described as a process or method. Although the various steps can be described as a sequential process, some of the operations can be performed in parallel or concurrently. Furthermore, examples of the methods can be implemented by hardware, software, firmware, middleware, microcode, hardware description languages, or any combination thereof. When implemented in software, firmware, middleware, or microcode, the program code or code segments to perform the necessary tasks can be stored in a non-transitory computer-readable medium such as a storage medium. Processors can perform any or all steps.

Having described several exemplary configurations, various modifications, alternative constructions, and equivalents can be used without departing from the spirit of the disclosure. The above elements can be components of a larger system, wherein other rules can take precedence over or modify the application of the invention. Accordingly, the above description does not bound the scope of the claims.

All patents, patent applications, and other publications cited in this application are incorporated by reference in their entirety for all purposes.

What is claimed is:

1. A linear accelerator comprising:
a linear accelerator body, in which is defined:
a plurality of cavities along a beamline extending between an input and an output;
a pair of distribution waveguide manifolds, wherein the distribution waveguide manifolds are connected such that alternating pairs of cell sections are connected to opposite distribution waveguide manifolds, and
a sequence of feed arms connecting the manifolds to the plurality of cavities; and
a single RF power feed common to both of the pair of distribution waveguide manifolds and the plurality of cavities, wherein the RF power feed comprising a main body that splits into two arms that each extends to a corresponding manifold of the pair of waveguide manifolds.

2. The linear accelerator of claim 1, wherein the single RF power feed comprises a Y-coupler RF waveguide.

3. The linear accelerator of claim 2, wherein the Y-coupler RF waveguide comprises the main body that splits into the two arms that each extends to an RF port of the corresponding manifold of the pair of waveguide manifolds.

4. The linear accelerator of claim 3, wherein the Y-coupler RF waveguide comprise an RF window for a single RF input.

5. The linear accelerator of claim 3, wherein the Y-coupler is designed so as to be machinable on a CNC machine.

6. The linear accelerator of claim 1, wherein each of the plurality of cavities is optimized.

7. The linear accelerator of claim 6, wherein a design of each of the plurality of cavities is individually optimized by application of a scattering matrix.

8. The linear accelerator of claim 6, wherein each of the plurality of cavities is individually optimized by adjusting their lengths and shapes for an electron speed at a location of the respective cavity along the beamline.

9. The linear accelerator of claim 1, wherein the plurality of cavities includes one or more cavities defined for a buncher and capture section so that the length is optimized to match the beam bunch arrival time with the RF phase for the varying sub-speed of light beam velocities along these sections.

10. The linear accelerator of claim 9, wherein the buncher and capture section comprises at least one cavity configured for both buncher and capture functions with varying lengths or periods to accommodate the slowly varying beam speeds upon approaching the speed of light.

11. The linear accelerator of claim 9, wherein the plurality of cavities includes multiple subsequent cavities along the beamline defined as an accelerating section.

12. The linear accelerator of claim 11, wherein the common RF power feed powers both the buncher and capture section and the accelerating section.

13. The linear accelerator of claim 1, wherein the sequence of feed arms are defined as a plurality of T-cell junctions.

14. The linear accelerator of claim 13, wherein a geometry of each of the plurality of T-cell junctions coupling the manifolds to the plurality of cells is optimized such that the dimensions thereof differ along a length of the beamline so as to appropriately supply power in a correct phase for each respective cavity of the plurality.

15. The linear accelerator of claim 13, wherein a geometry of each of the plurality of T-cells coupling the manifolds to the plurality of cells are designed so as to be machinable on a CNC machine.

16. The linear accelerator of claim 13, wherein a connection between the T-junction and the cavity is achieved through a narrow, folded waveguide section with a specific or optimized length by which any or all of the following objectives are achieved:

(1) preventing a choke condition on the T-junction when the cavity is tuned to off resonance due to manufacturing error or breakdown events;

(2) the length of this folded waveguide supplies a constant phase from the manifold to the respective cavity; and (3) use of the folding of the waveguide provides an added degree of freedom so as to keep a total length between the manifold and the cavity independent from the location of an exit of the manifold to an entrance of the respective cavity, wherein distances between the exit of the manifold and the entrance to the respective cavities change because of changing periods of the cavities and periods of the T-junctions.

17. The linear accelerator of claim 1, wherein each waveguide manifold comprise a plurality of irises and Miter bends to allow for equal distribution of power with minimum losses in the forward direction.

18. The linear accelerator of claim 1, wherein the linear accelerator is configured such that a first cavity of the plurality of cavities can be fed independently at a lower power and with a varying phase so as to bunch the initial beam and therefore affect the captured electrons from a DC gun.

19. The linear accelerator of claim 18 further comprising: a separate waveguide coupling on top of the linear accelerator body with a separate RF power feed.

20. The linear accelerator of claim 18, further comprising a tap-off from one of the waveguide manifolds so as to externally couple the power to the top of the linear accelerator body and the connection between the tap-off and the respective cavity can be done through a variable phase shifter and variable attenuator so as to adjust the power to the first cavity.

21. The linear accelerator of claim 18, wherein the linear accelerator is configured such that power can also be supplied to the first cavity from an individual phase-locked amplifier or an oscillator.

22. The linear accelerator of claim 18, wherein the linear accelerator is configured such that power can also be supplied to the first cavity by tapping off from the main power to the linear accelerator.

23. The linear accelerator of claim 18, wherein the linear accelerator is configured such that the first cavity is powered independently.

24. The linear accelerator of claim 18, wherein a set of initial cavities of the plurality of cavities are powered independently such that capture is not affected by the main: power supply to the linear accelerator.

25. The linear accelerator of claim 23, wherein the configuration allows varying the main power to the linear accelerator so as to provide a variable energy linear accelerator.

26. The linear accelerator of claim 23, wherein the linear accelerator is configured such that the initial set of cavities can be powered by their own Y-coupler and two manifolds as a sub-section of the main linear accelerator thus allowing also for a variable current by changing capture through a variation of power and phase between the first cavity and the remining cavities of the initial set of cavities in addition to providing variability of energy.

27. The linear accelerator of claim 26, wherein the linear accelerator is configured such that current to the linear accelerator can be modified using only the buncher cavity for operating as a varying-dose linear accelerator by changing the phase and the amplitude of the first cavity.

28. A method of designing a high-efficiency distributed linear accelerator, the method comprising:

determining cavity geometries and waveguide geometries of a linear accelerator body of which is defined from a conductive metal block, where the linear accelerator body having a plurality of cavities aligned along a central beamline and a pair of manifold waveguides on opposite sides of the central beamline for distribution of power supply to the plurality of cavities from a single common RF feed, and the RF power feed having a main body that splits into two arms that each extends to a corresponding manifold of the pair of waveguide manifolds; and determining coupling junction geometries of a plurality of waveguide coupling junctions between the pair of manifolds, where each of the cavities transmits RF from the pair of manifolds to the plurality of cavities, wherein a respective cavity is optimized individually by application of a scattering matrix, and this same optimization approach is iteratively to each other cavity of the plurality such that the geometries of each of the plurality of cavities is optimized for an electron speed associated with a given location along the beamline.

29. The method of claim 28, wherein due to the differing cavity geometries of the plurality of cavities, a distance between the plurality of cavities and the respective manifolds coupled thereto differs along the beamline, the method further comprising:

determining said waveguide geometries of the plurality of waveguide coupling junctions so as to include a serpentine portion such that a length of a waveguide channel for each of the plurality of waveguide coupling junctions is consistent along the beamline.

30. The method of claim 28, determining a geometry of a Y-coupler RF waveguide for the single RF feed to supply RF power to both manifolds and the plurality of channels of the entire linear accelerator.

31. The method of claim 28, wherein the conductive metal is copper.

32. A method of forming a high-efficiency distributed linear accelerator, the method comprising:

fabricating a linear accelerator body from a conductive metal, by a CNC machine in two blocks of the conductive metal, the linear accelerator body having a plurality of cavities aligned along a central beamline and a pair of waveguide manifolds on opposite sides of the central beamline for distribution of power supply to the plurality of cavities, wherein the linear accelerator body is defined by upper and lower halves;

fabricating a plurality of waveguide coupling junctions between the pair of waveguide manifolds and each of the cavities in order to transmit the supply RF power from a single common RF power feed coupled to the pair of waveguide manifolds to the plurality of cavities, wherein each of the cavities is optimized individually by application of a scattering matrix such that the geometries of each of the plurality of cavities is optimized for an electron speed associated with a given location along the beamline, wherein the waveguide coupling junctions are fabricated by a CNC machine in two blocks of the conductive metal that define the upper and lower halves; and fabricating a Y-coupler RF waveguide for coupling the single RF power feed to the pair of waveguide manifolds by a CNC machine in conductive metal.

33. The method of claim 32, wherein the Y-coupler RF supply is formed within three or less parts.

34. The method of claim 32, wherein the conductive metal is copper.

* * * * *